(12) United States Patent
Kim

(10) Patent No.: US 12,117,119 B1
(45) Date of Patent: Oct. 15, 2024

(54) INSULATING COVER DEVICE OF PIPE-INSULATING STRUCTURE, AND MANUFACTURING METHOD THEREFOR

(71) Applicant: DONG IN ENGINEERING CO., LTD., Gyeongju-si (KR)

(72) Inventor: Sang Ki Kim, Pohangsi (KR)

(73) Assignee: DONG IN ENGINEERING CO., LTD., Gyeongju-si (KR)

( * ) Notice: Subject to any disclaimer, the term of this patent is extended or adjusted under 35 U.S.C. 154(b) by 0 days.

(21) Appl. No.: 18/702,483

(22) PCT Filed: Nov. 24, 2021

(86) PCT No.: PCT/KR2021/017376
§ 371 (c)(1),
(2) Date: Apr. 18, 2024

(87) PCT Pub. No.: WO2023/080315
PCT Pub. Date: May 11, 2023

(30) Foreign Application Priority Data

Nov. 8, 2021 (KR) .......................... 10-2021-0152230

(51) Int. Cl.
*F16L 59/02* (2006.01)
*F16L 59/11* (2006.01)

(52) U.S. Cl.
CPC .............. *F16L 59/11* (2013.01); *F16L 59/024* (2013.01)

(58) Field of Classification Search
CPC .......... F16L 59/02; F16L 59/21; F16L 59/024
USPC ...... 138/149, 156, 157, 158; 285/45, 47–49, 285/53
See application file for complete search history.

(56) References Cited

U.S. PATENT DOCUMENTS

| | | | | |
|---|---|---|---|---|
| 3,559,694 A | * | 2/1971 | Volberg | F16L 59/22 285/47 |
| 3,818,949 A | * | 6/1974 | Johnson | F16L 59/024 138/158 |
| 3,886,981 A | * | 6/1975 | Eliason | B21C 37/09 138/149 |

FOREIGN PATENT DOCUMENTS

| | | |
|---|---|---|
| KR | 20-0207806 | 12/2000 |
| KR | 10-2004-0081397 | 9/2004 |
| KR | 10-1727682 | 4/2017 |
| KR | 10-1820450 | 1/2018 |
| KR | 10-1889443 | 8/2018 |

* cited by examiner

Primary Examiner — Patrick F Brinson
(74) Attorney, Agent, or Firm — LEX IP MEISTER, PLLC

(57) ABSTRACT

The present invention relates to an insulating cover device of a pipe-insulating structure. The insulating cover device of a pipe-insulating structure, according to the present invention, comprises: a finishing cover; a protective sheet having, at the end thereof, a ring part into which a steel wire is inserted; and a connecting socket for connecting the finishing cover and the protective sheet, wherein the finishing cover is coupled to the connecting socket by means of a plurality of ring-shaped pressing parts press-molded in a ring shape on an inner vertical plate part of the connecting socket, and the ring part is clamped in a form of being encompassed by a plurality of clamping hooks cut from the inner vertical plate part of the connecting socket and then rolled up, so that the protective sheet is coupled to the connecting socket.

10 Claims, 13 Drawing Sheets

[FIG. 1]
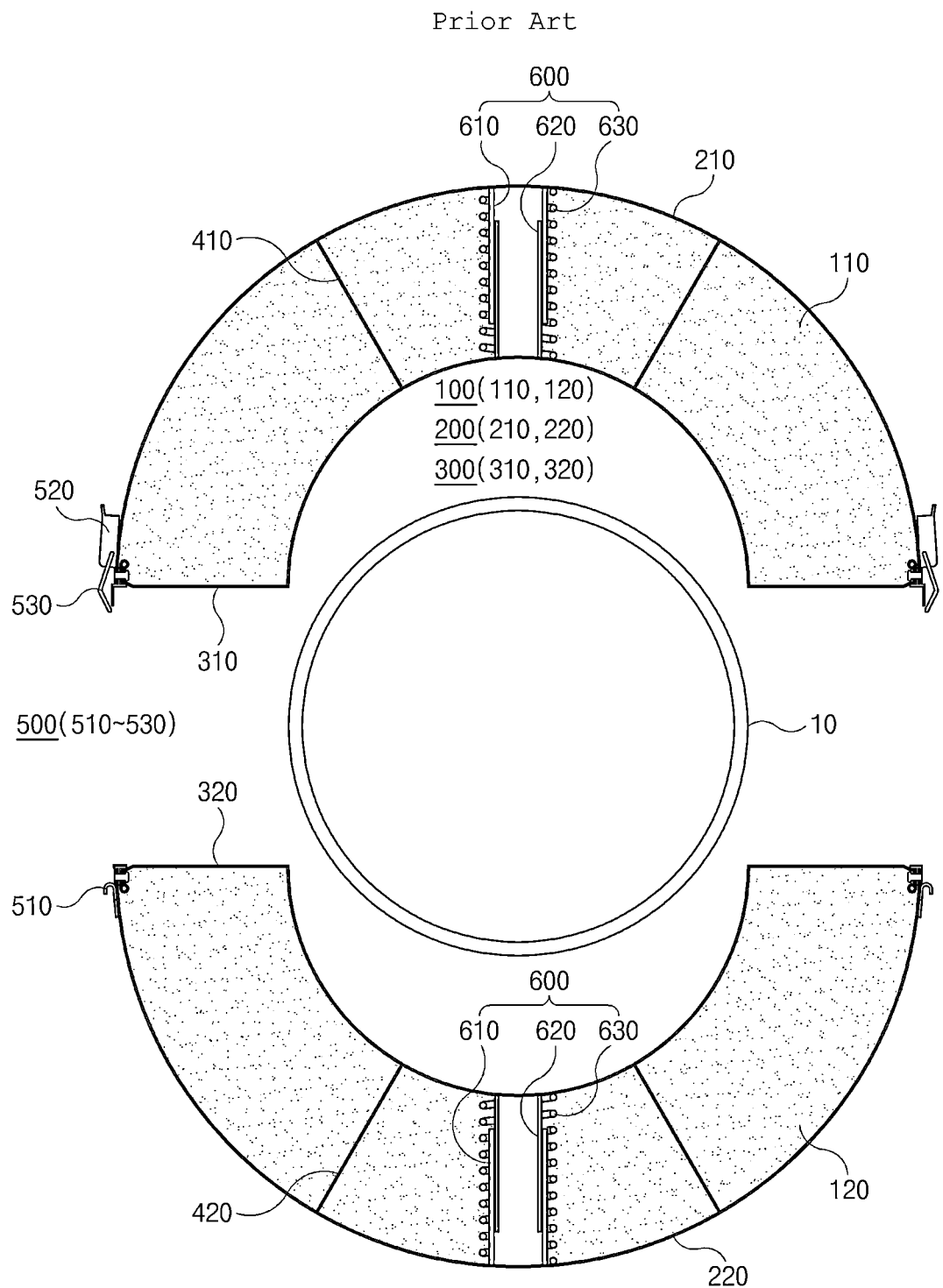

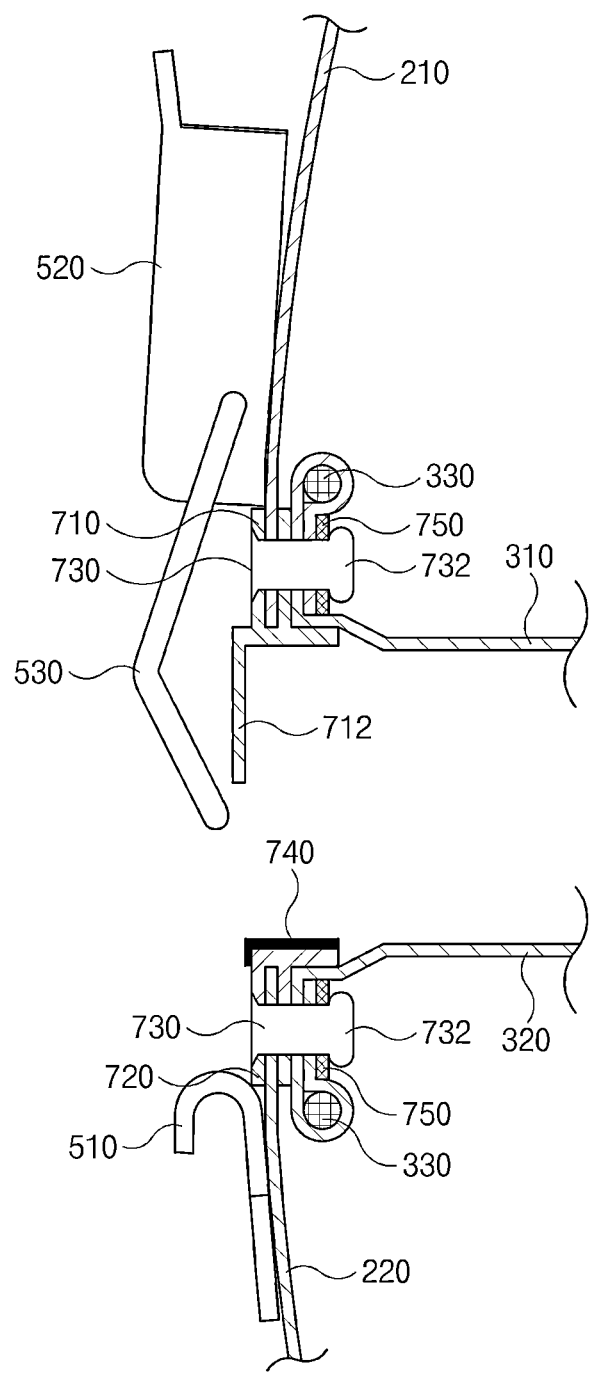
[FIG. 2]
Prior Art

[FIG. 3]
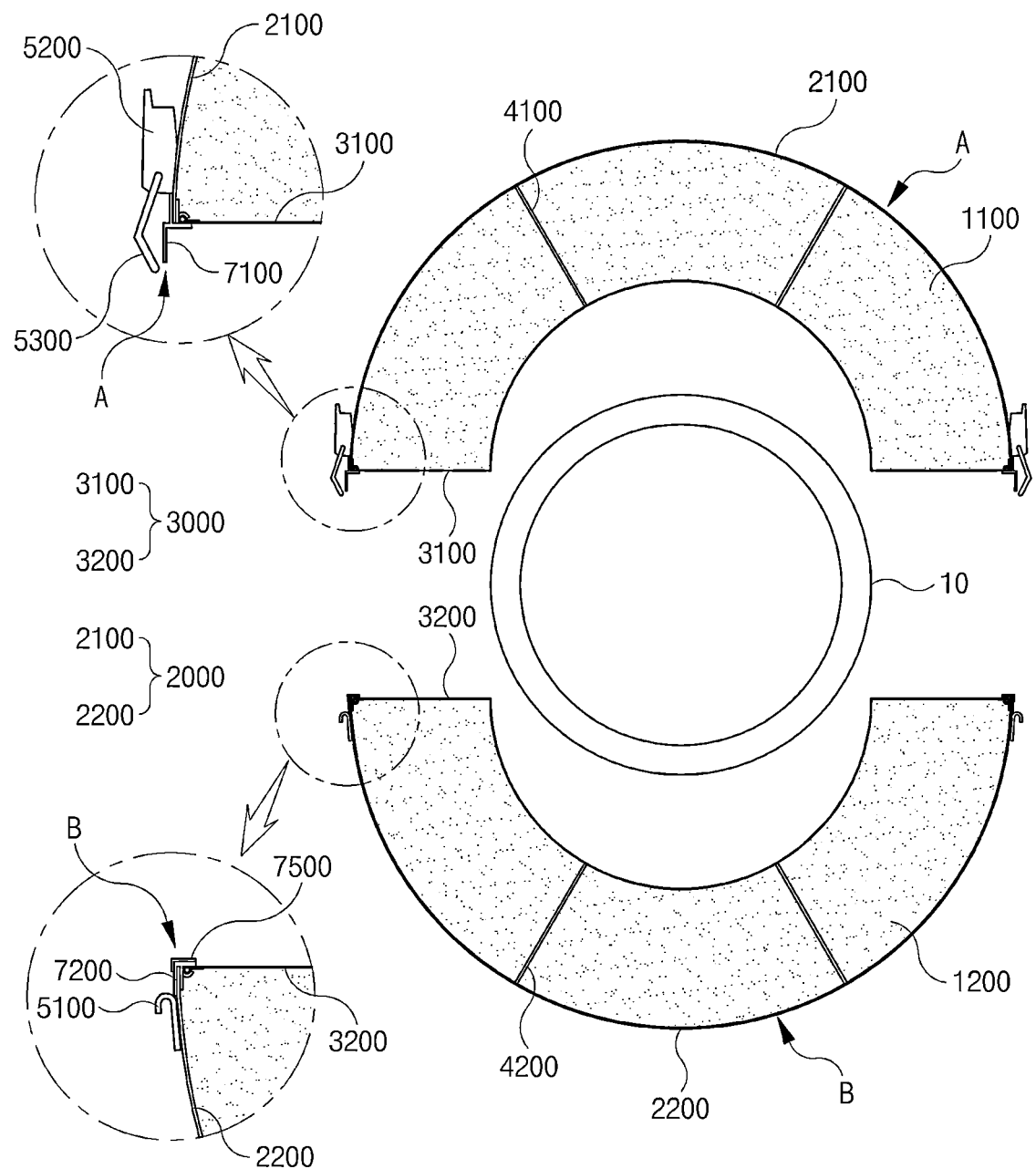

[FIG. 4]
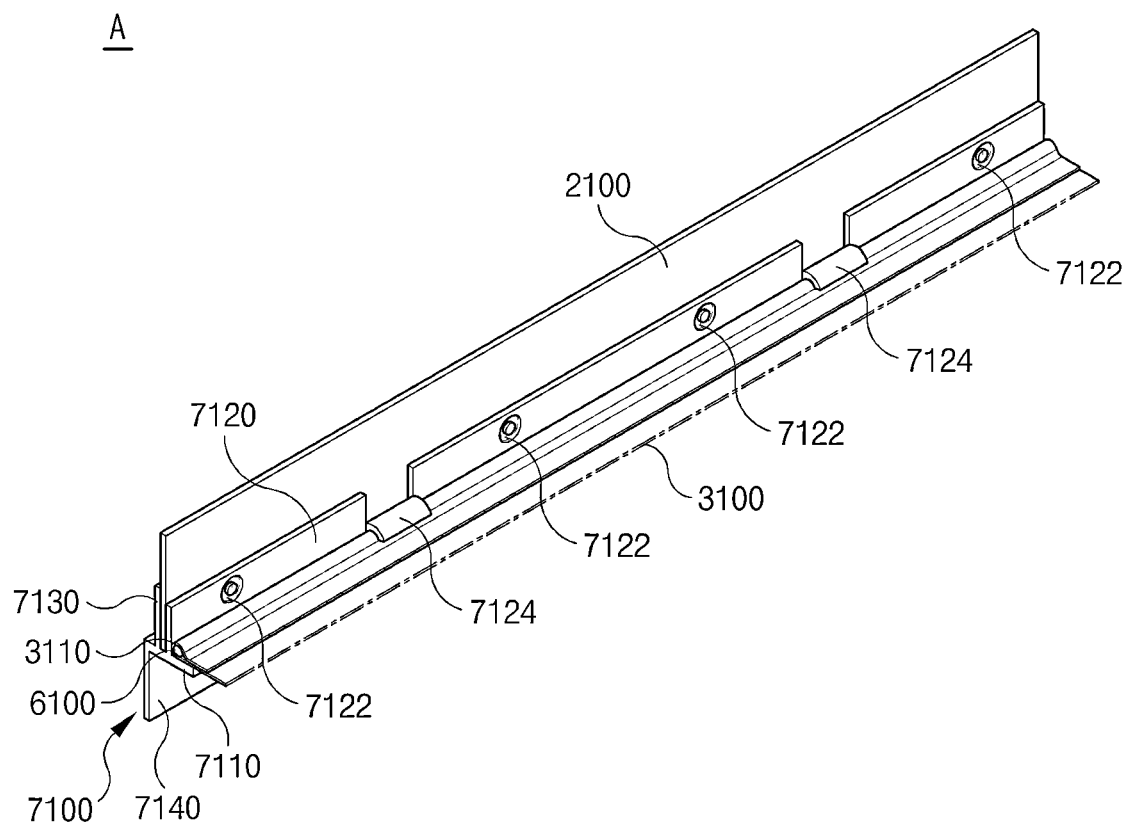

[FIG. 5]
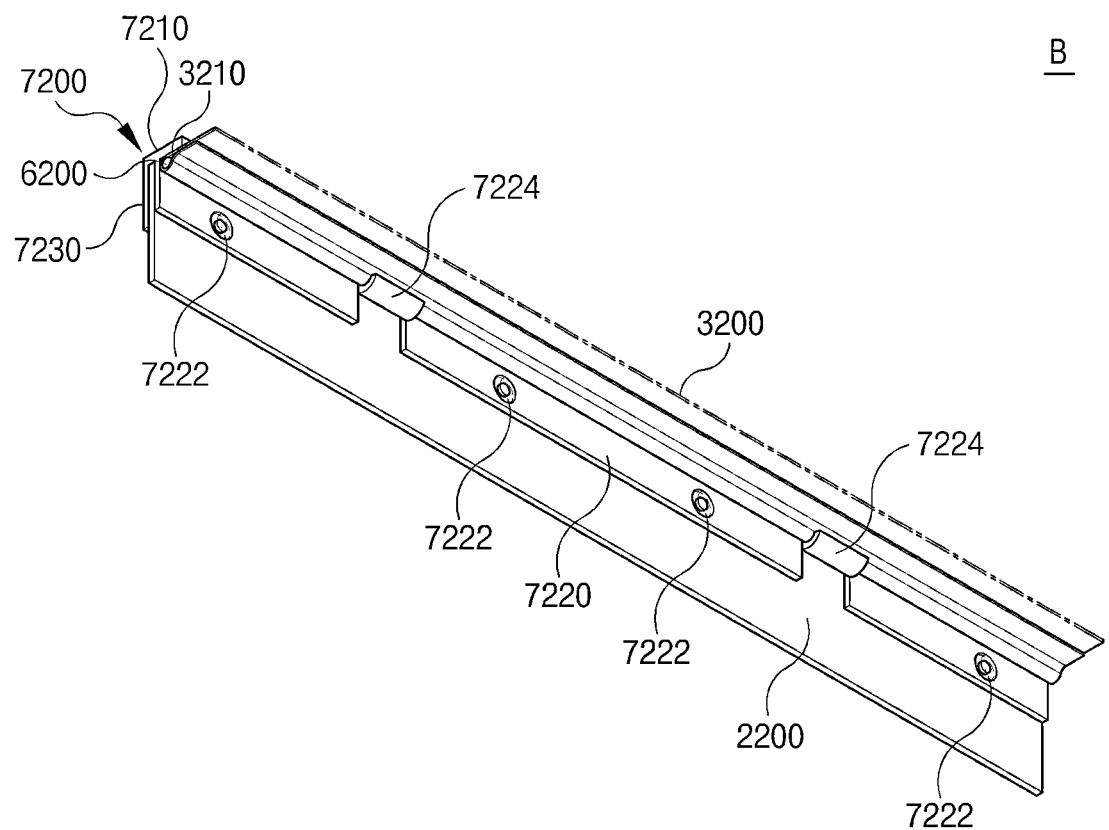

[FIG. 6]
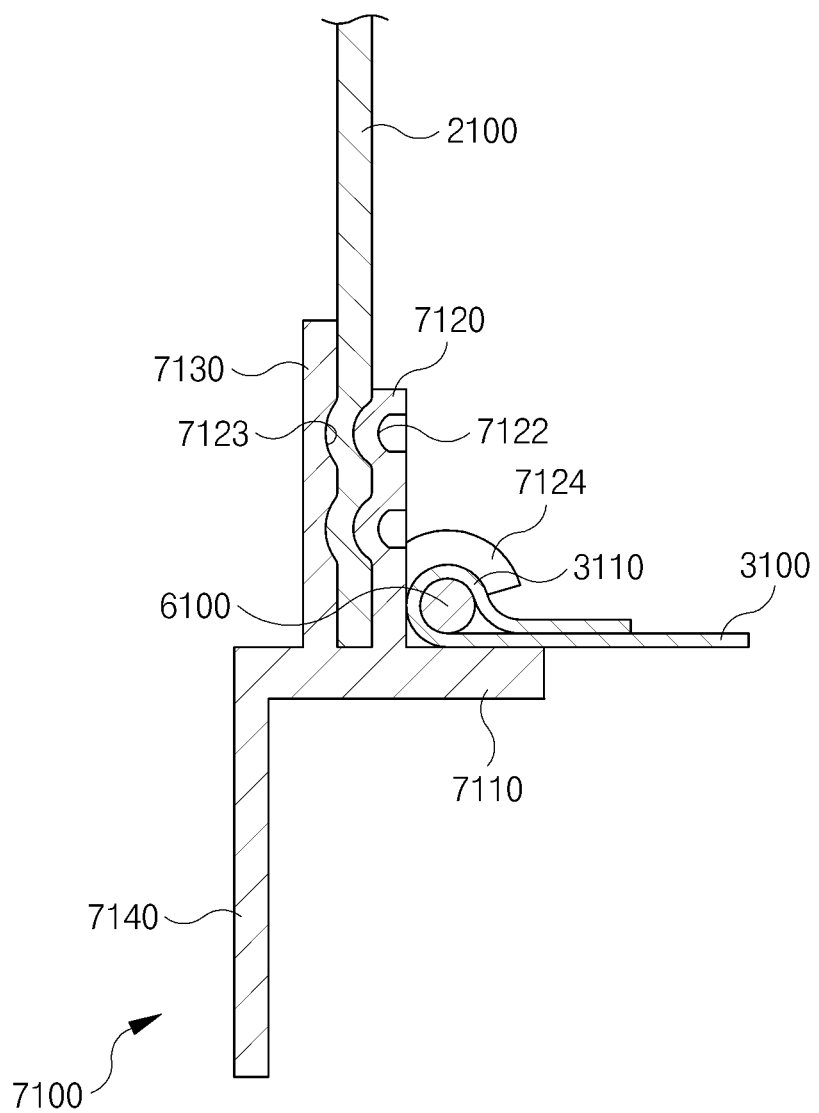

[FIG. 7]
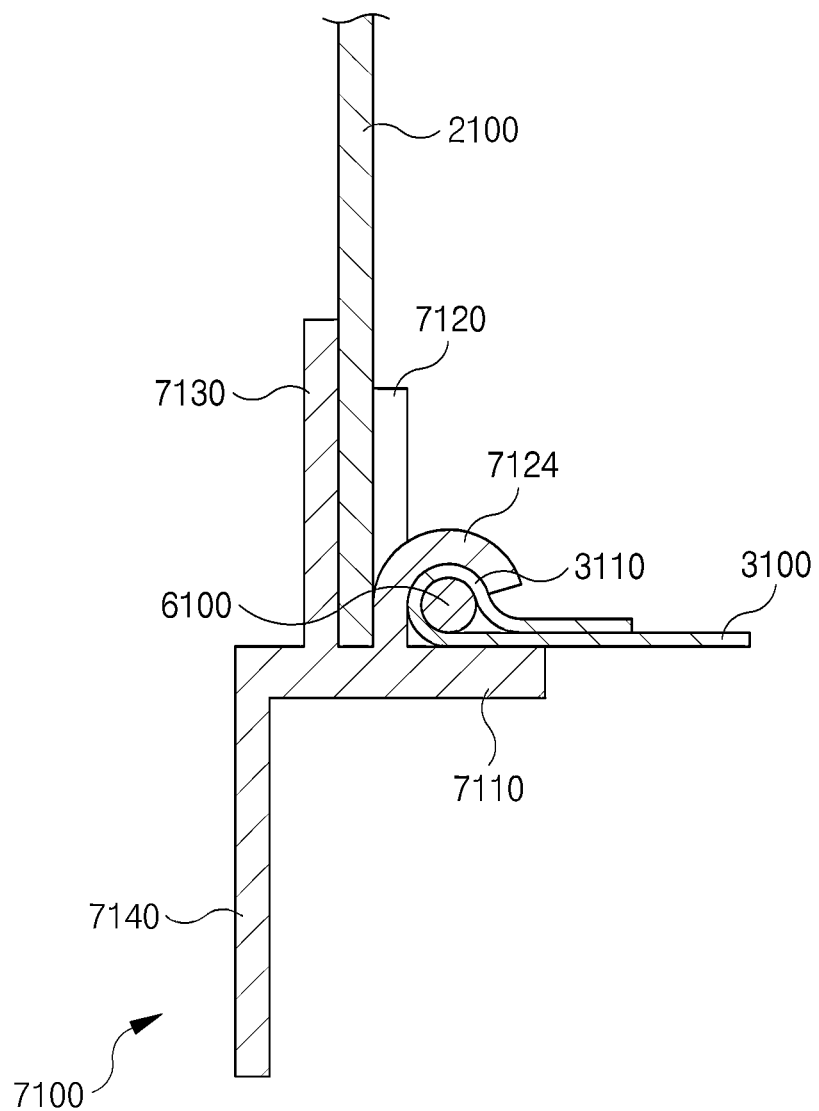

[FIG. 8]
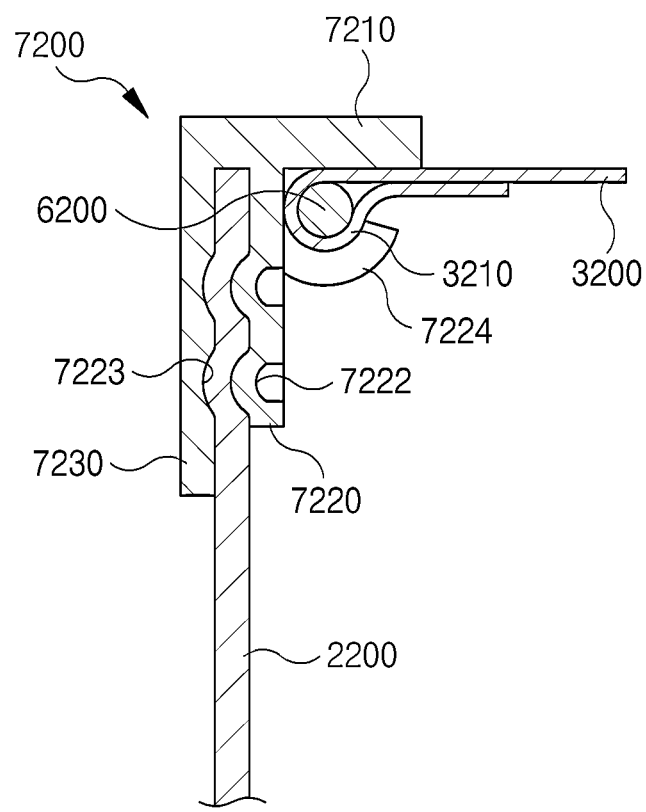

[FIG. 9]
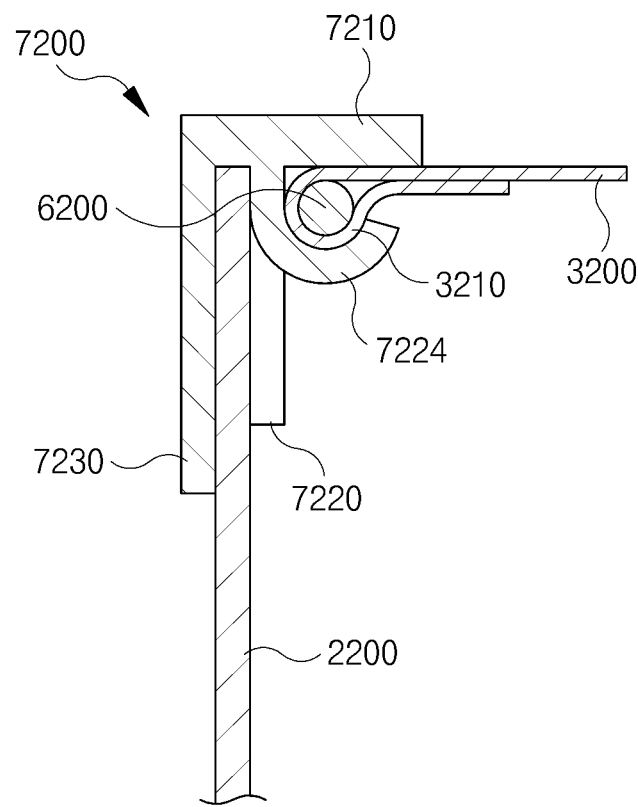

[FIG. 10]
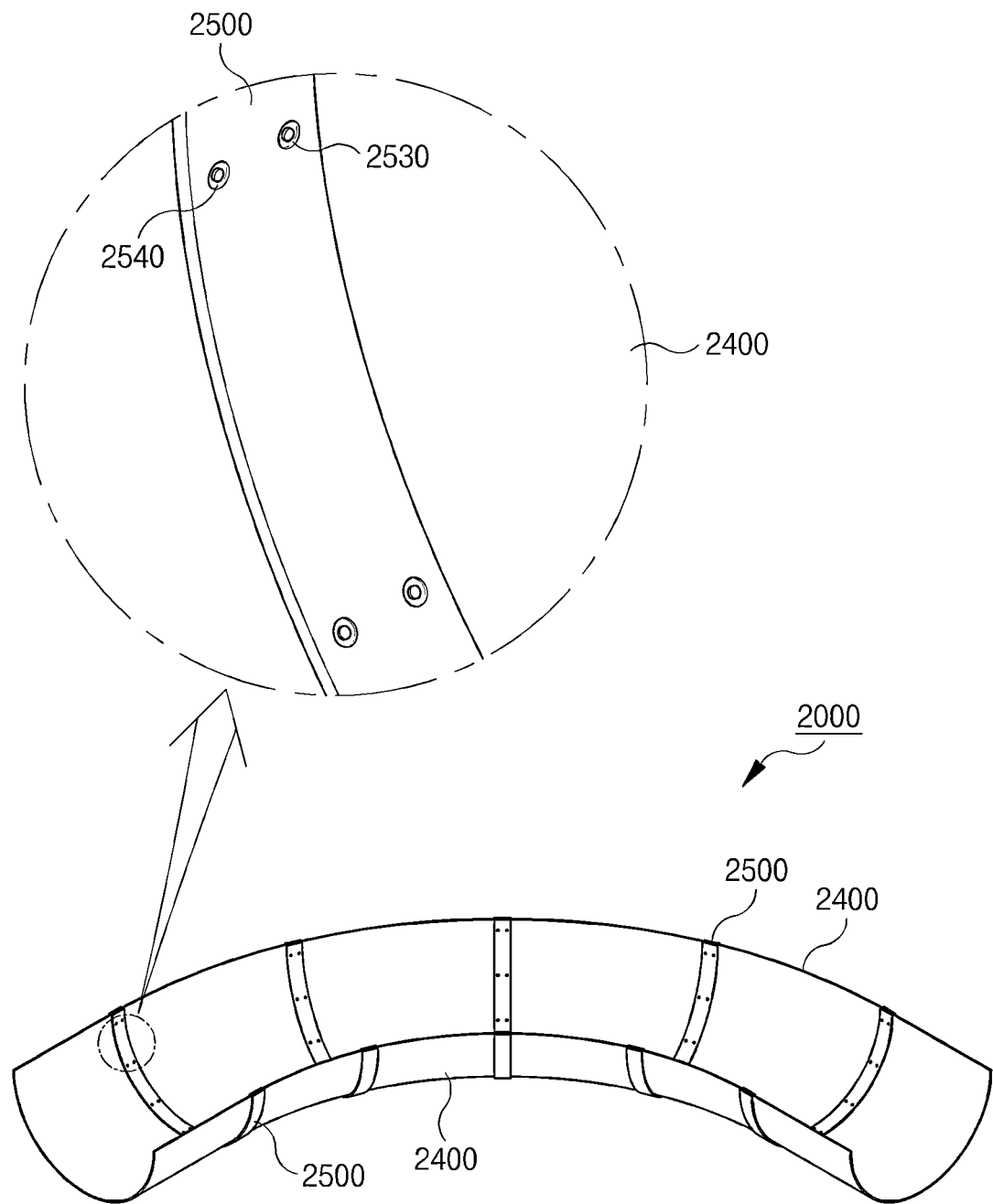

[FIG. 11]
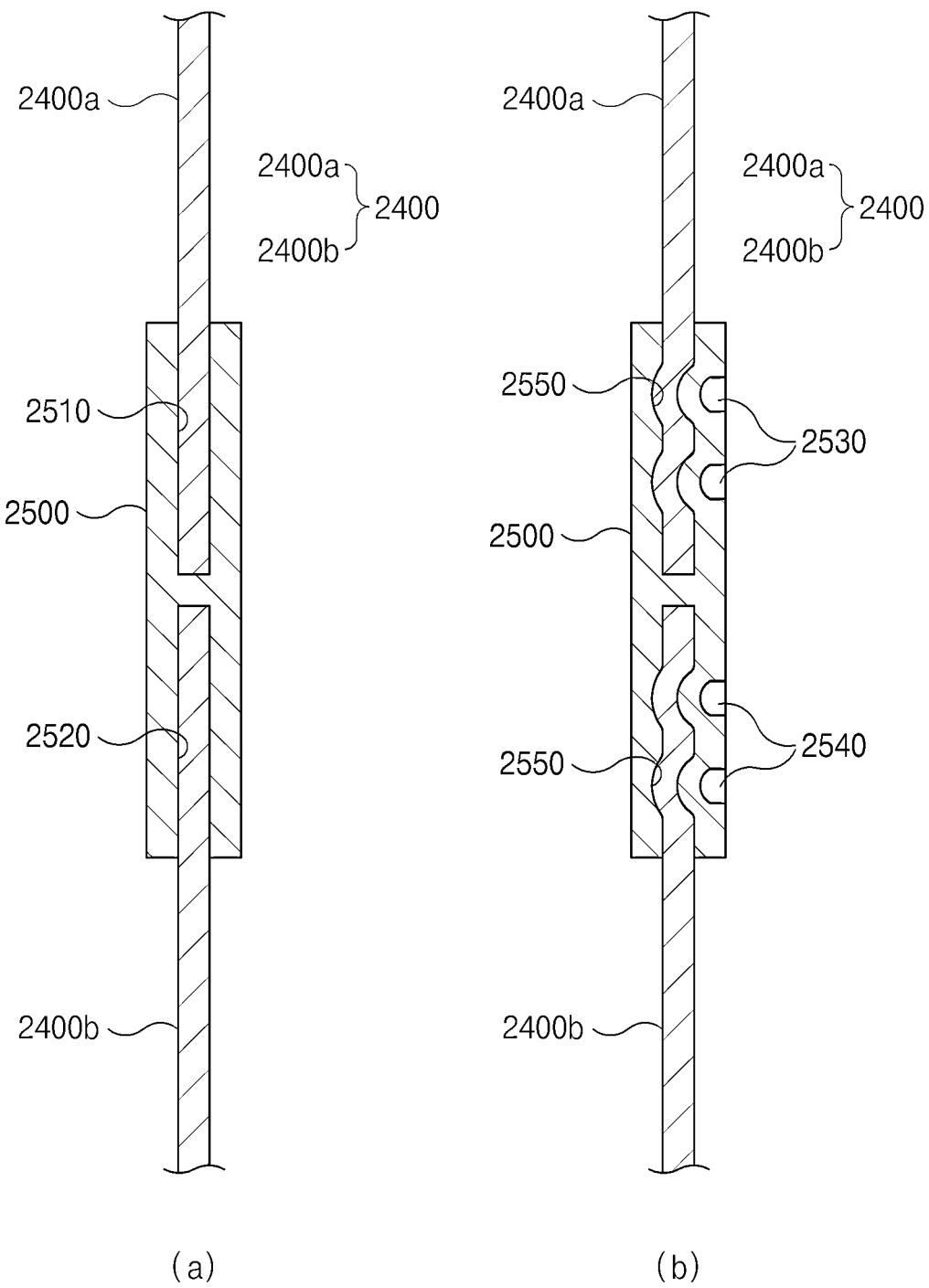
(a)   (b)

[FIG. 12]
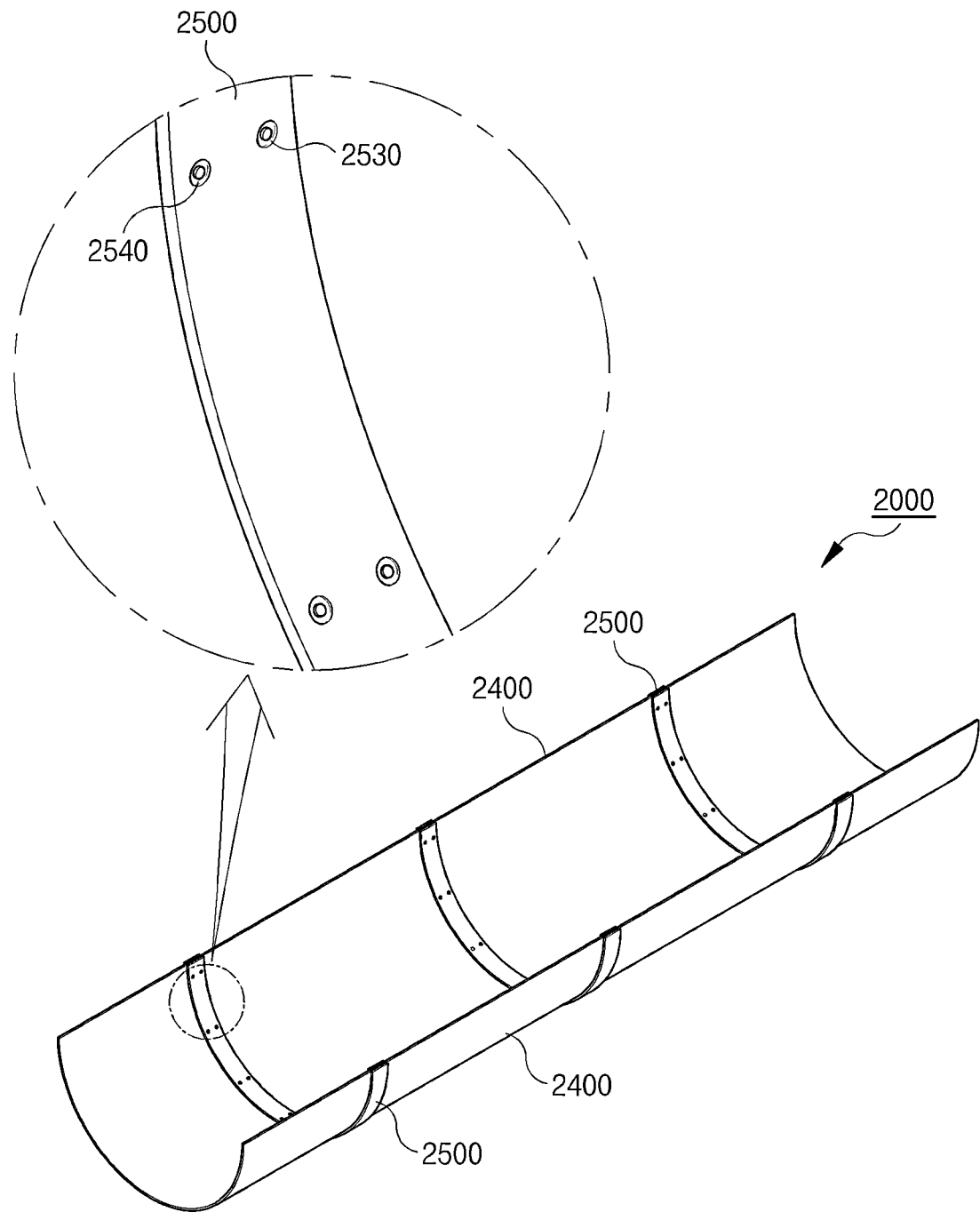

[FIG. 13]
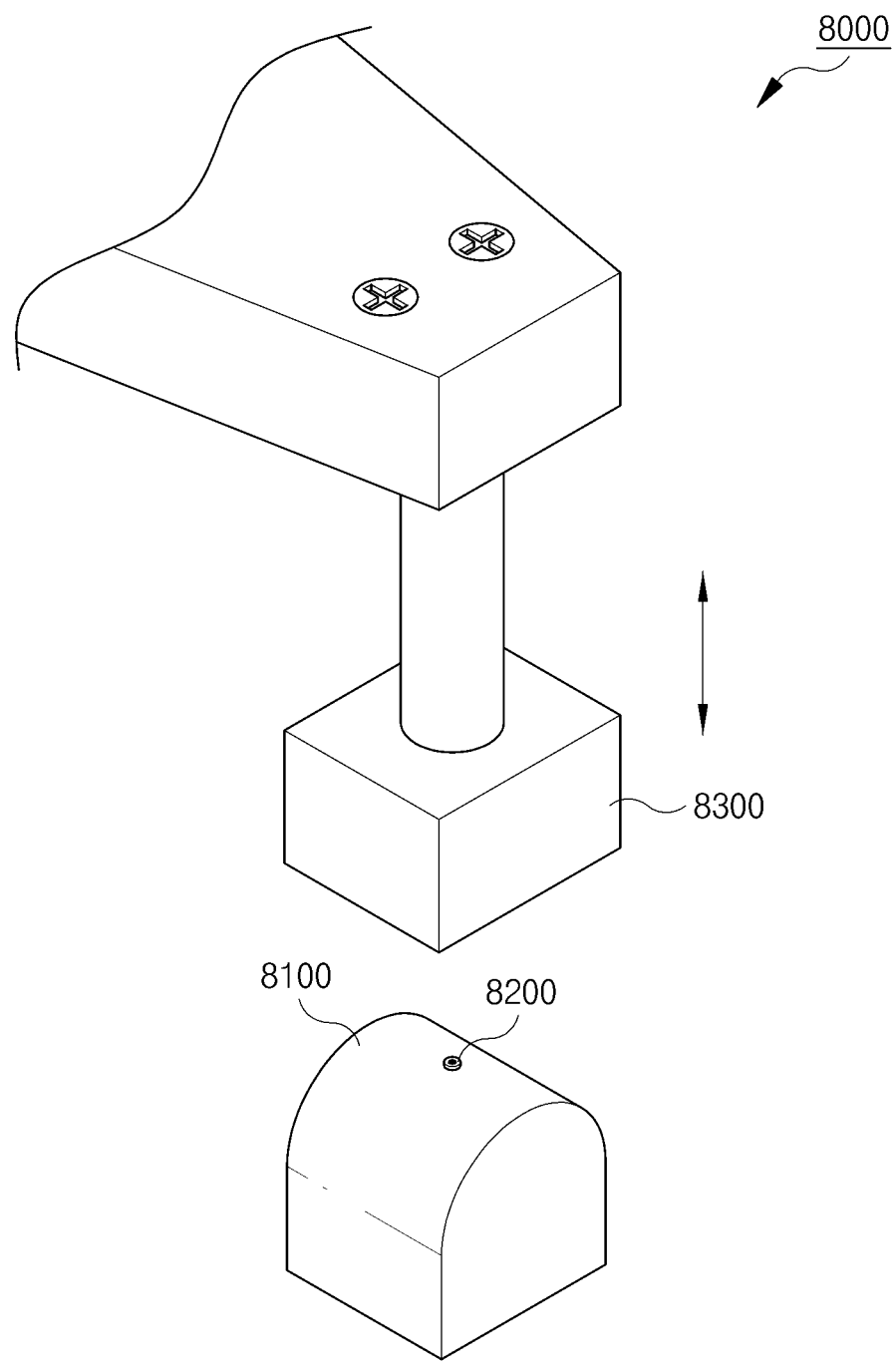

INSULATING COVER DEVICE OF PIPE-INSULATING STRUCTURE, AND MANUFACTURING METHOD THEREFOR

TECHNICAL FIELD

The present disclosure relates to an insulating cover device of a pipe-insulating structure installed to surround the external surface of a pipe and, more particularly, to an insulating cover device of a pipe-insulating structure and a manufacturing method therefor, in which the device includes a finishing cover and a protective sheet that cover an insulator surrounding a pipe, and a socket that connects the finishing cover and the protective sheet to each other.

BACKGROUND ART

Generally, various piping facilities are installed in buildings such as office buildings, industrial buildings, and apartments, and these piping facilities are used with thermal insulating covers installed therein for the purpose of insulating for keeping warmth and coolness, or additionally, for extending the life of the piping facilities and exterior design, and these thermal insulating covers are mainly used for valves, T-shaped pipes, elbows, and straight pipes in piping equipment.

In particular, in power plants (nuclear power, and thermal power, etc.) and petrochemical plants, high-temperature and high-pressure steam produced in a boiler provides rotational force to a turbine, ultimately producing electrical energy. High-temperature and high-pressure steam and hot water are transferred at high speed to each system through a pipe, and during the transfer process, the thickness of the pipe becomes thin due to fluid friction and cavitation inside the pipe, and thus there is a potential risk leading to accidents in the system during normal operation. Accordingly, during planned preventive maintenance of a power generation facility, the soundness of the facility is checked by checking the thinning condition of the pipe (a condition in which the wall of the pipe becomes thinner due to causes such as corrosion).

When conducting a thinning inspection of the pipe, if the pipe is constructed with an insulator, the thinning inspection is conducted after sequentially removing a finishing cover made of metal and the insulator provided on the outside of the pipe. After the thinning inspection is completed, a new insulator is attached to the pipe and the pipe is finished with the finishing cover.

The method of constructing an insulator after such thinning inspection results in a huge waste of materials due to the discarded amount of the insulator and finishing cover that is removed every year. In particular, a pipe having elbows or T-joints requires not only highly skilled skills compared to the installation of a straight insulator, but if installed incorrectly, causes the increase of thermal stress due to the occurrence of thermal notches, and accordingly, a thinning phenomenon in the portions may progress significantly, which causes the problem of shortening the lifespan of the entire pipe.

In order to solve the problems described above, a pipe-insulating structure has been proposed that is easy to attach and detach and reduces the occurrence of insulation gaps, thereby simplifying the thinning inspection of a pipe and the construction of an insulator.

The conventional pipe-insulating structure as described above is disclosed in Korean Patent No. 10-1820450 (2018.01.15.), and is described with reference to FIGS. 1 and 2 as follows.

Referring to FIGS. 1 and 2, the conventional pipe-insulating structure includes a first insulator 110 and a second insulator 120, which have semi-cylindrical shapes, surrounding first and second sides of a width direction of a pipe 100, a first finishing cover 210 and a second finishing cover 220 made of aluminum covering outer surfaces of the first insulator 110 and the second insulator 120, a first protective sheet 310 and a second protective sheet 320 covering portions, which are not covered by the first finishing cover 210 or the second finishing cover 220, of the surfaces of the first insulator 110 and the second insulator 120, a coupling unit 500 including a coupling hook 510, a rotating piece 520, and a coupling link 530 to detachably couple the first finishing cover 210 and the second finishing cover 220 to each other, one pair of first coupling sockets 710 into which width-directional opposite ends of the first finishing cover 210 are respectively inserted, one pair of second coupling sockets 720 into which the width-directional opposite ends of the second finishing cover 220 are inserted, a coupling packing 740 inserted into a surface to which the first coupling sockets 710 and the second coupling sockets 720 faces each other, and multiple coupling rivets 730 coupled to pass through a portion, into which the first finishing cover 210 is inserted, of the first coupling sockets 710 after passing through a side of the width direction of the first protective sheet 310, and coupled to pass through a portion, into which the second finishing cover 220 is inserted, of the second coupling sockets 720 after passing through a side of the width direction of the second protective sheet 320. In addition, the width-directional opposite sides of each of the first protective sheet 310 and the second protective sheet 320 are folded so that a portion which the coupling rivets 730 penetrate is double-layered. In addition, a fixing wire 330 is inserted into a folded portion among the width-directional opposite sides of each of the first protective sheet 310 and the second protective sheet 320. In addition, a coupling washer 750 on which a head of the coupling rivets 730 is seated is provided.

In the conventional technology, the sockets 710 and 720 and the finishing covers 210 and 220 are made of aluminum, and the protective sheets 310 and 320 required to be coupled thereto are made of fabric such as ceramic fiber that cannot be combined well with aluminum, and thus the rivets 730 are used to combine the sockets 710 and 720 and the finishing covers 210 and 220 with a protective sheets 310 and 320. However, the conventional coupling method of using the rivets has the disadvantage of being cumbersome and complicated. In addition, there is a disadvantage that the rivets protrude to the outside and cause a bad appearance.

DISCLOSURE

Technical Problem

The present disclosure is intended to propose an insulating cover device of a pipe-insulating structure and a manufacturing method therefor, in which the device includes a finishing cover and a protective sheet that cover an insulator surrounding a pipe, and a socket that connects the finishing cover and the protective sheet to each other, wherein the protective sheet and the finishing cover can be easily and simply coupled to the socket, without additional elements such as rivets, etc.

Technical Solution

In order to accomplish the above objectives, an insulating cover device of a pipe-insulating structure according to an aspect of the present disclosure includes: a finishing cover configured to cover a portion of an outer surface of an insulator surrounding a pipe; a protective sheet arranged to cover a portion, which is not covered by the finishing cover, of the outer surface of the insulator, with the protective sheet having, at an end thereof, a ring part into which a steel wire is inserted; and a connecting socket configured to connect the finishing cover and the protective sheet, wherein the connecting socket comprises: a horizontal plate part; an inner vertical plate part extending perpendicularly from the horizontal plate part; an outer vertical plate part extending perpendicularly from the horizontal plate part, wherein an insertion groove into which the finishing cover is inserted is formed between the inner vertical plate part and the outer vertical plate part, and the finishing cover inserted into the insertion groove is coupled to the connecting socket by a plurality of ring-shaped pressing parts press-molded into ring shapes in the inner vertical plate part, and the ring part is clamped in a form of being surrounded by a plurality of clamping hooks cut from the inner vertical plate part and then bent or rolled up, so that the protective sheet is coupled to the connecting socket.

The finishing cover and the connecting socket may be made of soft metal, and the protective sheet may be made of fabric.

The plurality of ring-shaped pressing parts may be formed by pressing the inner vertical plate part with a punch having a ring-shaped cross section, and each of the finishing cover and the outer vertical plate part may be pressed by the ring-shaped pressing parts to have ring-shaped grooves so that the inner vertical plate part, the finishing cover, and the outer vertical plate part are engaged and coupled with each other.

While the ring part is arranged in a corner between the horizontal plate part and the inner vertical plate part, the clamping hooks cut from the inner vertical plate part and then bent or rolled up may clamp the ring part to surround the ring part, so that the protective sheet is coupled to the connecting socket.

The finishing cover may include at least one connecting chassis, which is made of soft metal, having a first chassis insertion groove formed in a first assembly end part and a second chassis insertion groove formed in a second assembly end part; and a plurality of plates made of soft metal, and while an end part of a first plate which is one of the plurality of plates is inserted into the first chassis insertion groove and an end part of a second plate adjacent to the first plate is inserted into the second chassis insertion groove, the connecting chassis and the first plate may be coupled to each other by a plurality of ring-shaped pressing parts press-molded into ring shapes toward the first chassis insertion groove from an inner surface of the connecting chassis, and the connecting chassis and the second plate may be coupled to each other by a plurality of ring-shaped pressing parts press-molded into ring shapes toward the second chassis insertion groove from the inner surface of the connecting chassis, so that the plurality of plates and the at least one connecting chassis are coupled correspondingly to a curved surface of the pipe.

The at least one connecting chassis may have a flat plate shape with an "H"-shaped cross section, or have a shape with a bent or curved cross section in a middle part thereof so that the first assembly end part and the second assembly end part have a predetermined angle therebetween.

The at least one connecting chassis and the plates inserted into the at least one connecting chassis may respectively have ring-shaped grooves formed by being pressed by the ring-shaped pressing parts, so that the at least one connecting chassis and the plates are engaged and coupled with each other.

In order to accomplish the above objectives, a method of manufacturing the insulating cover device of the pipe-insulating structure according to another aspect of the present disclosure includes: preparing the finishing cover configured to cover the outer surface of the insulator surrounding the pipe, and the protective sheet arranged to cover the portion, which is not covered by the finishing cover, of the outer surface of the insulator, with the protective sheet having, at an end thereof, the ring part into which a steel wire is inserted, and preparing the connecting socket integrally comprising the horizontal plate part, the inner vertical plate part extending perpendicularly from the horizontal plate part, and the outer vertical plate part extending perpendicularly from the horizontal plate part, with the insertion groove being formed between the inner vertical plate part and the outer vertical plate part, so as to connect the finishing cover and the protective sheet to each other; coupling the finishing cover and the connecting socket to each other by forming the plurality of ring-shaped pressing parts in the inner vertical plate part while an end part of the finishing cover is inserted into the insertion groove after inserting the end part of the finishing cover into the insertion groove; and coupling the protective sheet and the connecting socket to each other by clamping the ring part in the form of surrounding the ring part, into which the steel wire is inserted, by using clamping hooks cut from the inner vertical plate part and then bent or rolled up while the ring part of the protective sheet is placed in the corner between the horizontal plate part and the inner vertical plate part of the connecting socket.

The plurality of ring-shaped pressing parts may be formed by pressing the inner vertical plate part with a punch having a ring-shaped cross section, and each of the finishing cover and the outer vertical plate part may be pressed by the ring-shaped pressing parts to have ring-shaped grooves so that the inner vertical plate part, the finishing cover, and the outer vertical plate part are engaged and coupled with each other.

The finishing cover may include at least one connecting chassis, which is made of soft metal, having the first chassis insertion groove formed in a first end part and the second chassis insertion groove formed in a second end part; and the plurality of plates made of soft metal, and while the end part of the first plate which is one of the plurality of plates is inserted into the first chassis insertion groove and the end part of the second plate adjacent to the first plate is inserted into the second chassis insertion groove, the connecting chassis and the first plate may be coupled to each other by the plurality of ring-shaped pressing parts press-molded into ring shapes toward the first chassis insertion groove from the inner surface of the connecting chassis, and the connecting chassis and the second plate may be coupled to each other by the plurality of ring-shaped pressing parts press-molded into ring shapes toward the second chassis insertion groove from the inner surface of the connecting chassis, so that the plurality of plates and the at least one connecting chassis are coupled correspondingly to the curved surface of the pipe.

Advantageous Effects

According to the present disclosure, when the finishing cover and the protective sheet covering an insulator surrounding the pipe, and the socket connecting the finishing cover and the protective sheet are coupled to each other, it is possible to perform the coupling simply and rapidly without additional elements such as rivets, etc. In addition, it is possible to assemble the finishing cover simply and quickly so that the finishing cover corresponds to the curved surface of the pipe without need for separate coupling members.

DESCRIPTION OF DRAWINGS

FIGS. 1 and 2 are views illustrating a conventional technology.

FIG. 3 is a view illustrating a pipe-insulating structure to which an insulating cover device is applied according to an embodiment of the present disclosure.

FIG. 4 is a perspective view illustrating a first insulating cover device according to an embodiment of the present disclosure.

FIG. 5 is a perspective view illustrating a second insulating cover device according to an embodiment of the present disclosure.

FIG. 6 is a cross-sectional view illustrating ring-shaped pressing parts of the first insulating cover device according to an embodiment of the present disclosure.

FIG. 7 is a cross-sectional view illustrating the coupled portion of a clamping hook of the first insulating cover device according to an embodiment of the present disclosure.

FIG. 8 is a cross-sectional view illustrating ring-shaped pressing parts of the second insulating cover device according to an embodiment of the present disclosure.

FIG. 9 is a cross-sectional view illustrating the coupled portion of a clamping hook of the second insulating cover device according to an embodiment of the present disclosure.

FIG. 10 is a schematic view of a finishing cover to be applied to an elbow pipe among finishing covers.

FIG. 11 is enlarged views before and after the formation of the ring-shaped pressing parts in coupled portions of the connecting chassis and plate of FIG. 10.

FIG. 12 is a schematic view of a finishing cover to be applied to a straight pipe among the finishing covers.

FIG. 13 is a schematic view of a device for forming the ring-shaped pressing parts.

MODE FOR INVENTION

Hereinafter, with reference to the attached drawings, embodiments of the present disclosure will be described in detail so that those skilled in the art can easily perform the embodiments. The present disclosure may be implemented in several different forms and is not limited to the embodiments described herein.

When explaining the present disclosure, the size or shape of components shown in the drawings may be exaggerated or simplified for clarity and convenience of the explanation.

In addition, terms specifically defined in consideration of the configuration and operation of the present disclosure may vary depending on the intent or practices of a user or operator. These terms should be interpreted with meanings and concepts consistent with the technical idea of the present disclosure on the basis of the content throughout this specification.

In order to clearly explain the present disclosure, descriptions of parts unrelated to the technical idea of the present disclosure are omitted, and identical or similar components are assigned the same reference numerals throughout the specification.

In addition, in various embodiments, components having the same configuration will be described only in a representative embodiment by using the same reference numerals, and in other embodiments, only components that are different from those of the representative embodiment will be described.

Throughout the specification, when a part is said to be "connected" to another part, this includes not only a case in which the part is "directly connected" to the another part, but also a case in which the part is "indirectly connected" to the another part with still another part placed therebetween. In addition, when a part is said to "include" a certain component, this may mean that the part further includes other components rather than excluding the other components, unless specifically stated to the contrary.

Hereinafter, an embodiment of an insulating cover device of a pipe-insulating structure according to the present disclosure will be described in detail with reference to the accompanying drawings.

FIG. 3 is an exploded cross-sectional view of the pipe-insulating structure according to an embodiment of the present disclosure, FIGS. 4 and 5 are perspective views illustrating a first insulating cover device A and a second insulating cover device B, and FIGS. 6 to 9 are cross-sectional views illustrating the first insulating cover device A and the second insulating cover device B. FIG. 6 is a cross-sectional view illustrating ring-shaped pressing parts of the first insulating cover device A, FIG. 7 is a cross-sectional view illustrating a coupled portion of a clamping hook of the first insulating cover device A, FIG. 8 is a cross-sectional view illustrating ring-shaped pressing parts of the second insulating cover device B, and FIG. 9 is a cross-sectional view illustrating a coupled portion of a clamping hook of the second insulating cover device B.

As illustrated in FIGS. 3 to 9, the pipe-insulating structure according to an embodiment of the present disclosure is installed to surround a pipe 100 through which high-temperature and high-pressure steam or hot water flows, thereby increasing the insulation of the pipe 100 and preventing damage to the pipe 100 due to external shock. Although not shown, an additional structure that can attenuate vibration and noise generated from the pipe 100 may be provided.

The pipe-insulating structure of the present disclosure can be modified and applied to suit the shapes of elbow pipes, straight pipes, flange pipes, valve pipes, and T-shaped pipes, etc.

In this embodiment, the pipe-insulating structure includes a first insulator 1100 and a second insulator 1200 which respectively have semi-cylindrical shapes and surround a first side and a second side in the width direction of the pipe 100, the first insulating cover device A and the second insulating cover device B that respectively surround the outer surfaces of the first insulator 1100 and the second insulator 1200, and coupling units that couple the first insulating cover device A and the second insulating cover device B to each other. Although not shown, an additional anti-vibration means that absorbs vibration generated from the pipe 100 may be provided.

The first insulator 1100 and the second insulator 1200 may be composed of various insulators, and may have a single-layer structure or a composite-layer structure in which different insulators from each other form a plurality of layers.

The first insulating cover device A and the second insulating cover device B have a structure that couples a finishing cover 2000 and a protective sheet 3000 to each other, wherein the finishing cover 2000 may be divided into a first finishing cover 2100 constituting the first insulating cover device A and a second finishing cover 2200 constituting the second insulating cover device B, and the protective sheet 3000 may be divided into a first protective sheet 3100 constituting the first insulating cover device A and a second protective sheet 3200 constituting the second insulating cover device B.

Specifically, the first insulating cover device A and the second insulating cover device B according to the embodiment respectively include the first finishing cover 2100 and the second finishing cover 2200 covering portions of the outer surfaces of the first insulator 1100 and the second insulator 1200, and the first protective sheet 3100 and the second protective sheet 3200 covering portions, which are not covered by the first finishing cover 2100 and the second finishing cover 2200, of the outer surfaces of the first insulator 1100 and the second insulator 1200.

The first insulating cover device A and the second insulating cover device B constitute one insulating cover structure having a cylindrical shape when coupled to each other, and constitute the pipe-insulating structure when including insulators provided therein.

The first finishing cover 2100 and the second finishing cover 2200 can be made of soft metal materials such as aluminum or aluminum alloy to ensure convenience during manufacturing while maintaining rigidity against external impacts.

The first insulating cover device A and the second insulating cover device B or the first finishing cover 2100 and the second finishing cover 2200 are provided on the left and right sides and are separably coupled to each other by the multiple coupling units arranged along a longitudinal direction. In this embodiment, the coupling units may include a coupling hook 5100 fixedly coupled to the second finishing cover 2200, a rotating piece 5200 coupled rotatably to the first finishing cover 2100, and a coupling link 5300 bent so that a first side thereof may be coupled to the rotating piece 5200 and a second side thereof is coupled to the coupling hook 5100.

In addition, the first protective sheet 3100 and the second protective sheet 3200 are respectively arranged to surround some surfaces of the first insulator 1100 and the second insulator 1200 so that the outer surfaces of the first insulator 1100 and the second insulator 1200 which are not covered by the first finishing cover 2100 and the second finishing cover 2200, that is, outer surfaces other than the outer circumferential surfaces of the first insulator 1100 and the second insulator 1200 are not exposed to the outside.

In this case, the first protective sheet 3100 and the second protective sheet 3200 are made of non-flammable fabric such as ceramic fiber to prevent damage caused by heat generated from the pipe 100. Since the first protective sheet 3100 and the second protective sheet 3200 are made of fabric, the first protective sheet 3100 and the second protective sheet 3200 have flexible characteristics, so it is possible for the first protective sheet 3100 and the second protective sheet 3200 to surround the pipe 100 so that the first protective sheet 3100 and the second protective sheet 3200 are in close contact with the pipe 100 even if the surface of the pipe 100 is irregular or has some protrusions.

The first protective sheet 3100 and the second protective sheet 3200 are respectively connected to the first finishing cover 2100 and the second finishing cover 2200 by a first connecting socket 7100 and a second connecting socket 7200 to be described later. In order to stably couple the first protective sheet 3100 and the second protective sheet 3200 having flexible characteristics to the first connecting socket 7100 and the second connecting socket 7200, respectively, the first protective sheet 3100 and the second protective sheet 3200 are folded and overlapped at end portions thereof and then sewn to form first and second ring parts 3110 and 3210, and the first and second steel wires 6100 and 6200 which respectively have predetermined strengths and circular cross-sections are longitudinally inserted into and installed in the first and second ring parts 3110 and 3210, respectively. The protective sheet 3100 or 3200 is not made of metal, but is made of soft fabric with flexible characteristics, and thus when the protective sheet 3100 or 3200 is coupled directly to the finishing cover 2100 or 2200 made of metal, the protective sheet 3100 or 3200 may be easily detached from the finishing cover 2100 or 2200. Accordingly, the ring part 3100 or 3210 into which the steel wire 6100 or 6200 is inserted is formed so that the end portion of the protective sheet 3100 or 3200 may be more securely coupled to the finishing cover 2100 or 2200.

Meanwhile, spaces defined by the finishing cover 2000 and the protective sheet 3000 may be configured as a plurality of cells so that the insulator 1100 or 1200 located between the finishing cover 2000 and the protective sheet 3000 is not tilted or biased to one side, that is, so that the position of the insulator 1100 or 1200 is maintained to be fixed. For example, the plurality of cells may be formed by each of first and second connection sheets 4100 or 4200 having a first longitudinal end connected to the protective sheet 3000 and having a second longitudinal end connected through the insulator 1100 or 1200 to the finishing cover 2000.

As described above, the first insulating cover device A and the second insulating cover device B according to this embodiment respectively includes the first finishing cover 2100 and the second finishing cover 2200 covering the outer surfaces of the first insulator 1100 and the second insulator 1200, the first protective sheet 3100 and the second protective sheet 3200, which are not covered by the first finishing cover 2100 and the second finishing cover 2200, of the outer surfaces of the first insulator 1100 and the second insulator 1200, and the first connecting socket 7100 and the second connecting socket 7200 for connecting the first protective sheet 3100 and the second protective sheet 3200 to the first finishing cover 2100 and the second finishing cover 2200.

The first connecting socket 7100 may be formed by extrusion molding by using soft metal materials such as aluminum or aluminum alloy materials. In addition, as illustrated in FIGS. 6 and 7, the first connecting socket 7100 integrally includes a first horizontal plate part 7110, a first inner vertical plate part 7120 extending perpendicularly from the first horizontal plate part 7110, and a first outer vertical plate part 7130 extending perpendicularly from the first horizontal plate part 7110 so as to be parallel to the first inner vertical plate part 7120.

A first insertion groove into which the first finishing cover 2100 is inserted is formed between the first inner vertical plate part 7120 and the first outer vertical plate part 7130. It is preferable that the first finishing cover 2100 is completely inserted into the first insertion groove up to a depth at which the side end of the first finishing cover 2100 is in contact with the first horizontal plate part 7110.

As illustrated in FIG. 6, the first finishing cover 2100 inserted into the first insertion groove is securely fixed to the first insertion groove by a plurality of first ring-shaped pressing parts 7122 press-molded into ring shapes on the first inner vertical plate part 7120. Each of the plurality of first ring-shaped pressing parts 7122 may be formed by pressing the first inner vertical plate part 7120 with a punch of a ring-shaped cross section. Specifically, as illustrated in FIG. 13, the punch 8200 having a ring-shaped cross section is installed on a bottom plate 8100, and while the pressed portion of the inner vertical plate part 7120 is positioned above the punch 8200, it is possible to form the first ring-shaped pressing parts 7122 by pressing the corresponding portion of the outer vertical plate part 7130 located on the upper side of the inner vertical plate part 7120 with a press 8300. Here, it may be considered to use a punch with a circular or other cross-sectional shape instead of a ring-shaped cross-section.

The depth of the first ring-shaped pressing part 7122 corresponds to the length of the punch 8200 protruding from the bottom plate 8100, and thus it is possible to adjust the depth of the first ring-shaped pressing part 7122 by adjusting the protrusion length of the punch 8200. The bottom plate 8100 may have a round protruding structure for an efficient operation.

Each of the first ring-shaped pressing parts 7122 has a shape protruding toward the first finishing cover 2100, and the first finishing cover 2100 is pressed by the first ring-shaped pressing part 7122, and the first outer vertical plate part 7130 is pressed by the pressed portion of the first finishing cover 2100, that is, pressure for forming the first ring-shaped pressing part 7122 is applied successively to the first finishing cover 2100 and the first outer vertical plate part 7130, so a ring-shaped groove 7123 is formed in a portion corresponding to each of the first finishing cover 2100 and the first outer vertical plate part 7130, that is, a portion to which pressure is applied. Accordingly, the first inner vertical plate part 7120, the first finishing cover 2100, and the first outer vertical plate part 7130 are engaged and coupled with each other.

As mentioned above, the first protective sheet 3100 is folded and overlapped at an end portion thereof and then sewn to form the first ring part 3110, and the first steel wire 6100 which has a predetermined strength and a circular cross-section is longitudinally inserted into and installed in the ring part 3110.

Meanwhile, as illustrated in FIG. 7, while the first ring part 3110 into which the steel wire 6000 is inserted is arranged in a corner between the first horizontal plate part 7110 and the first inner vertical plate part 7120, the first protective sheet 3100 is fixed to the first connecting socket 7100. In order to fix the first protective sheet 3100, the first connecting socket 7100 integrally includes a plurality of first clamping hooks 7124 cut from the first inner vertical plate part 7120 and then bent or rolled up to clamp the first ring part 3110 in the form of surrounding the first ring part 3110 into which the first steel wire 6100 is inserted.

In order to form each of the plurality of first clamping hooks 7124, a first process of cutting the first inner vertical plate part 7120 to form one pair of opposing cutting lines, and a second process of forming the first clamping hook 7124 by bending or rolling up a cut part, that is, a part cut between the one pair of cutting lines into a ring shape to clamp the first ring part 3110 in the form of surrounding the first ring part 3110 of the first protective sheet 3100 into which the first steel wire 6100 is inserted are sequentially performed. The first process and the second process may be performed at once by one device, or may be performed separately by separate devices.

In addition, the first connecting socket 7100 further include an extension plate part 7140 extending in a vertical direction opposite to the extending direction of the first inner vertical plate part 7120 and the first outer vertical plate part 713 so that the end part of the first horizontal plate part 7100 covers the outer surface of the second connecting socket 7200. In this case, a packing 7500 may be provided between the extension plate part 7140 and the outer surface of the second connecting socket 7200.

Meanwhile, the second connecting socket 7200 is formed by extrusion molding by using soft metal materials such as aluminum or aluminum alloy materials, and may constitute one set of sockets together with the first connecting socket 7100 described above. In addition, as illustrated in FIGS. 8 and 9, the second connecting socket 7200 integrally includes a second horizontal plate part 7210, a second inner vertical plate part 7220 extending perpendicularly from the second horizontal plate part 7210, and a second outer vertical plate part 7230 that is parallel to the second inner vertical plate part 7220 and extends perpendicularly from the second horizontal plate part 7210.

A second insertion groove into which the second finishing cover 2200 is inserted is formed between the second inner vertical plate part 7220 and the second outer vertical plate part 7230. It is preferable that the second finishing cover 2200 is completely inserted into the second insertion groove up to a depth at which the side end of the second finishing cover is in contact with the second horizontal plate part 7210.

As illustrated in FIG. 8, the second finishing cover 2200 inserted into the second insertion groove is securely fixed to the second insertion groove by a plurality of second ring-shaped pressing parts 7222 press-molded into ring shapes on the second inner vertical plate part 7220. Each of the plurality of second ring-shaped pressing parts 7222 may be formed by pressing the second inner vertical plate part 7220 with the punch of a ring-shaped cross section. The forming method of the second ring-shaped pressing parts 7222 is the same as the forming method of the first ring-shaped pressing parts 7122.

Each of the second ring-shaped pressing parts 7222 has a shape protruding toward the second finishing cover 2200, the second finishing cover 2200 is pressed by the second ring-shaped pressing parts 7222, and the second outer vertical plate part 7230 is pressed by the pressed portions of the second finishing cover 2200. That is, as pressure for forming the second ring-shaped pressing parts 7222 is applied successively to the second finishing cover 2200 and the second outer vertical plate part 7230, ring-shaped grooves 7223 are formed in corresponding portions of each of the second finishing cover 2200 and the second outer vertical plate part 7230, that is, portions to which pressure is applied. Accordingly, the second inner vertical plate part 7220, the second finishing cover 2200, and the first outer vertical plate part 7230 are engaged and coupled with each other.

The end portion of the second protective sheet 3200 is folded and overlapped at an end portion thereof and then sewn to form the second ring part 3210, and the second steel wire 6200 which has a predetermined strength and a circular cross-section is longitudinally inserted into and installed in the second ring part 3210.

Meanwhile, as illustrated in FIG. 9, while the second ring part 3210 into which the second steel wire 6200 is inserted is arranged in a corner between the first horizontal plate part 7210 and the second inner vertical plate part 7220, the second protective sheet 3200 is fixed to the second connecting socket 7200. In order to fix the second protective sheet 3200, the second connecting socket 7200 integrally includes the plurality of second clamping hooks 7224 cut from the second inner vertical plate part 7220 and then bent or rolled up to clamp the second ring part 3210 in the form of surrounding the second ring part 3210 into which the second steel wire 6200 is inserted.

In order to form each of the plurality of second clamping hooks 7224, a first process of cutting the second inner vertical plate part 7220 to form one pair of opposing cutting lines, and a second process of forming the second clamping hook 7224 by bending or rolling up a cut part, that is, a part cut between the one pair of cutting lines into a ring shape to clamp the ring part 3210 of the second protective sheet 3200 into which the second steel wire 6200 is inserted are sequentially performed. The first process and the second process may be performed at once by one device, or may be performed separately by separate devices.

As described above, according to the present disclosure, the finishing cover 2100 or 2200 inserted between the inner vertical plate part 7120 or 7220 of the connecting socket 7100 or 7200 and the outer vertical plate part 7130 or 7230 is coupled to the connecting socket 7100 or 7200 by a plurality of ring-shaped pressing parts 7122 or 7222 formed by pressing the inner vertical plate part 7120 or 7220 by using the punch with a ring-shaped cross-section. In addition, the plurality of clamping hooks 7124 or 7224 cut from the inner vertical plate part 7120 or 7220 and then bent or rolled up clamps the ring part 3210 or 3220, into which the steel wire 6100 or 6200 is inserted, to fix the protective sheet 3100 or 3200 to the connecting socket 7100 or 7200, and accordingly, additional parts such as rivets or washers may be omitted, and a complex coupling work which uses parts such as rivets or washers may be omitted.

The manufacturing method of the insulating cover device A or B of a pipe-insulating structure described above will be described as follows.

First, prepared is the connecting socket 7100 or 7200 which includes the horizontal plate part 7110 or 7210, the inner vertical plate part 7120 or 7220 extending perpendicularly from the horizontal plate part 7110 or 7210, and the outer vertical plate part 7130 or 7230 extending perpendicularly from the horizontal plate part 7110 or 7210, with an insertion groove being formed between the inner vertical plate part 7120 or 7220 and the outer vertical plate part 7130 or 7230.

Next, the end part of the finishing cover 201000 described above is inserted into the insertion groove, and while the end part of the finishing cover 200 is inserted into the insertion groove, the plurality of ring-shaped pressing parts 7122 or 7222 fixing each of the plurality of finishing covers 2000 to the inner vertical plate part 7120 or 7220 is formed by pressing so that the finishing cover 2000 is fixedly coupled to the connecting socket 7100 or 7200.

In addition, in order to fix the protective sheet 3000 to the connecting socket 7100 or 7200, the end of the protective sheet 3100 or 3200 is overlapped to form the ring part 3110 or 3210, the steel wire 6100 or 6200 with a circular cross section described above is inserted into the ring part 3110 or 3210, while the ring part 3110 or 3210 into which the steel wire 6100 or 6200 is inserted is placed in the corner between the horizontal plate part 7110 or 7210 and the inner vertical plate part 7120 or 7220, and the clamping hook 7124 or 7224 formed by cutting and bending or rolling up the inner vertical plate part 7120 or 7220 clamps the ring part 3110 or 3210 to surround the ring part 3110 or 3210 into which the steel wire 6100 or 6200 is inserted, so the protective sheet 3000 is fixedly coupled to the connecting socket 7100 or 7200.

Meanwhile, as illustrated in FIG. 3, the finishing cover 2000 is the structure of covering the outer surface of the insulator 1100 or 1200 surrounding the pipe 100 and is configured to have a curved surface corresponding to the curved surface of the pipe 100. The finishing cover 2000 uses a plurality of plates and at least one connecting chassis to form the ring-shaped pressing parts described above, and it is possible to form the ring-shaped pressing part by coupling the plurality of plates and the at least one connecting chassis to each other. Hereinafter, details will be described with reference to FIGS. 10 to 13.

FIG. 10 is a schematic view of a finishing cover to be applied to an elbow pipe among the finishing covers, and FIG. 11 is enlarged views before and after the formation of the ring-shaped pressing parts in coupled portions of the connecting chassis and plate of FIG. 10.

As illustrated in FIGS. 10 and 11, in the finishing cover 2000 constituting the insulating cover device A or B of the elbow pipe, the plurality of plates 2400 and the at least one connecting chassis 2500 are assembled correspondingly with the curved surface of the elbow pipe.

The finishing cover 2000 has a structure in which the at least one connecting chassis 2500 and the plurality of plates 2400 are assembled or combined with each other. As described through FIG. 3, an end part of the width direction of the finishing cover 2000 is coupled to the protective sheet 3000 through the connecting socket 7100 or 7200. A longitudinal end part of the finishing cover 2000 may also be coupled to the protective sheet 3000 through the connecting socket 7100 or 7200, as required.

The at least one connecting chassis 2500 and the plurality of plates 2400 that constitute the finishing cover 2000 may be made of soft metal such as aluminum or aluminum alloy.

A first chassis insertion groove 2510 is formed in a first assembly end part of the at least one connecting chassis 2500, and a second chassis insertion groove 2520 is formed in a second assembly end part on the opposite side. The at least one connecting chassis 2500 may have an "H"-shaped cross section, may have a flat plate-shaped cross section so that the first assembly end part and the second assembly end part form a straight line, may have a cross section bent in a middle portion thereof so that the first assembly end part and the second assembly end part have a predetermined angle therebetween, or may have a cross section of the shape of a curved surface that corresponds to the curved surface of the pipe 100.

The plurality of plates 2400 is provided to have predetermined lengths, and the insulating cover device A or B may have a flat shape or a curved shape corresponding to the curved surface of the pipe 100, and may have various widths to be formed into a structure that surrounds the curved surface of the elbow pipe.

The plurality of plates 2400 and the at least one connecting chassis 2500 are assembled as follows.

As illustrated in FIG. 11 (*a*), an end part of a first plate 2400*a* which is one of the plurality of plates 2400 is inserted into the first chassis insertion groove 2510, and an end part of a second plate 2400*b* adjacent to the first plate 2400*a* is inserted into the second chassis insertion groove 2520.

In this state, as illustrated in FIG. 11 (*b*), a plurality of third ring-shaped pressing parts 2530 press-molded into ring shapes toward the first chassis insertion groove 2510 from the inner surface of the at least one connecting chassis 2500 (a surface in contact with the insulator 1100 when the finishing cover 2000 covers the insulator 1100 in FIG. 3) is formed to couple the connecting chassis 2500 and the first plate 2400a to each other, and a plurality of fourth ring-shaped pressing parts 2540 press-molded into ring shapes toward the second chassis insertion groove 2520 from the inner surface of the connecting chassis 2500 (the surface in contact with the insulator 1100 when the finishing cover 2000 covers the insulator 1100 in FIG. 3) is formed to couple the connecting chassis 2500 and the second plate 2400b to each other.

In this way, the plurality of plates 2400 and the at least one connecting chassis 2500 are coupled correspondingly to the curved surface of the pipe 100 to form the finishing cover 2000.

Each of the plurality of third ring-shaped pressing parts 2530 and the plurality of fourth ring-shaped pressing parts 2540 may be formed by pressing the inner surface of the connecting chassis 2500 with the punch of a ring-shaped cross-section.

Specifically, as illustrated in FIG. 13, the punch 8200, which has a ring-shaped cross section, is installed on the bottom plate 8100, and while the pressed portion of the inner surface of the connecting chassis 2500 is positioned above the punch 8200, it is possible to form the plurality of third ring-shaped pressing parts 2530 and the plurality of fourth ring-shaped pressing parts 2540 by pressing the corresponding portion of the outer surface of the connecting chassis 2500 located on the above side thereof with a press. Here, it may be considered to use a punch with a circular or other cross-sectional shape instead of a ring-shaped cross-section.

In addition, the depth of each of the plurality of third ring-shaped pressing parts 2530 and the plurality of fourth ring-shaped pressing parts 2540 corresponds to the length of the punch 8200 protruding from the bottom plate 8100, and thus it is possible to adjust the depth of each of the plurality of third ring-shaped pressing parts 2530 and the plurality of fourth ring-shaped pressing parts 2540 by adjusting the protrusion length of the punch 8200. The bottom plate 8100 may have a round protruding structure for the efficient assembly of the finishing cover 2000 corresponding to the curved surface of the pipe. The device for forming the ring-shaped pressing part of FIG. 13 described above may have various structures well known to those skilled in the art.

The third ring-shaped pressing parts 2530 and the fourth ring-shaped pressing parts 2540 formed by pressing the inner surface of the connecting chassis 2500 have shapes protruding toward the plates 2400a and 2400b inserted respectively into the chassis insertion grooves 2510 and 2520 of the connecting chassis 2500, and the plates 2400a and 2400b are pressed by the third ring-shaped pressing parts 2530 and the fourth ring-shaped pressing parts 2540 formed inside the plates 2400a and 2400b inserted respectively into the chassis insertion grooves 2510 and 2520, and the connecting chassis 2500 located on the outer side of the plates 2400a and 2400b is pressed by the pressed portions of the plates 2400a and 2400b, so that ring-shaped grooves 2550 are formed in the portions of the connecting chassis to which pressure is applied.

That is, as pressure for forming the third ring-shaped pressing parts 2530 and the fourth ring-shaped pressing parts 2540 is applied successively to the inner side of the connecting chassis 2500, the plate 2400a or 2400b, and the outer side of the connecting chassis 2500, ring-shaped grooves 2550 are formed in the corresponding portions of each of the connecting chassis 2500 and the plate 2400a or 2400b, that is, portions to which pressure is applied. Accordingly, the connecting chassis 2500 and the plate 2400a or 2400b are engaged and coupled with each other.

Accordingly, the two plates 2400a and 2400b adjacent to each other are coupled to each other by the connecting chassis 2500. In this way, when the plurality of plates 2400 and the at least one connecting chassis 2500 are combined into the shape of a curved surface to correspond to the curved surface of the pipe 100, it is possible to form the finishing cover 2000 for an elbow pipe.

FIG. 12 illustrates the finishing cover 2000 constituting the insulating cover device A or B of the straight pipe. As illustrated in FIG. 12, it is possible to implement the finishing cover 2000 for the straight pipe by simply applying the assembling or combining method of the finishing cover of an elbow pipe described above.

In addition, it is clear that the assembling or combining method of the finishing cover explained through FIGS. 10 and 11 can be modified and applied to suit the shapes of flange pipes, valve pipes, and T-shaped pipes, etc.

As described above, according to the present disclosure, when combining the finishing cover and the protective sheet covering the insulator surrounding the pipe with the connecting socket, there is an advantage that it is possible to combine the finishing cover, the protective sheet, and the connecting socket to each other simply and rapidly without additional elements such as rivets. In addition, it is possible to assemble the finishing cover correspondingly with the curved surface of the pipe simply and rapidly without need for separate coupling members.

Although the present disclosure has been described in detail by using the exemplary embodiment, the scope of the present disclosure is not limited to a specific embodiment and should be interpreted in accordance with the scope of the attached claims. In addition, those skilled in the art should understand that many modifications and variations are possible without departing from the scope of the present disclosure.

The invention claimed is:

1. An insulating cover device of a pipe-insulating structure for pipe insulation, the device comprising:
   a finishing cover configured to cover a portion of an outer surface of an insulator surrounding a pipe;
   a protective sheet arranged to cover a portion, which is not covered by the finishing cover, of the outer surface of the insulator, with the protective sheet having, at an end thereof, a ring part into which a steel wire is inserted; and
   a connecting socket configured to connect the finishing cover and the protective sheet,
   wherein the connecting socket comprises: a horizontal plate part; an inner vertical plate part extending perpendicularly from the horizontal plate part; an outer vertical plate part extending perpendicularly from the horizontal plate part, wherein an insertion groove into which the finishing cover is inserted is formed between the inner vertical plate part and the outer vertical plate part, and
   the finishing cover inserted into the insertion groove is coupled to the connecting socket by a plurality of ring-shaped pressing parts press-molded into ring shapes in the inner vertical plate part, and the ring part is clamped in a form of being surrounded by a plurality of clamping hooks cut from the inner vertical plate part and then bent or rolled up, so that the protective sheet is coupled to the connecting socket.

2. The device of claim 1, wherein the finishing cover and the connecting socket are made of soft metal, and the protective sheet is made of fabric.

3. The device of claim 2, wherein the plurality of ring-shaped pressing parts is formed by pressing the inner vertical plate part with a punch having a ring-shaped cross section, and each of the finishing cover and the outer vertical plate part is pressed by the ring-shaped pressing parts to have ring-shaped grooves so that the inner vertical plate part, the finishing cover, and the outer vertical plate part are engaged and coupled with each other.

4. The device of claim 2, wherein while the ring part is arranged in a corner between the horizontal plate part and the inner vertical plate part, the clamping hooks cut from the inner vertical plate part and then bent or rolled up clamp the ring part to surround the ring part, so that the protective sheet is coupled to the connecting socket.

5. The device of claim 1, wherein the finishing cover comprises at least one connecting chassis, which is made of soft metal, having a first chassis insertion groove formed in a first assembly end part and a second chassis insertion groove formed in a second assembly end part; and a plurality of plates made of soft metal, and while an end part of a first plate which is one of the plurality of plates is inserted into the first chassis insertion groove and an end part of a second plate adjacent to the first plate is inserted into the second chassis insertion groove, the connecting chassis and the first plate are coupled to each other by a plurality of ring-shaped pressing parts press-molded into ring shapes toward the first chassis insertion groove from an inner surface of the connecting chassis, and the connecting chassis and the second plate are coupled to each other by a plurality of ring-shaped pressing parts press-molded into ring shapes toward the second chassis insertion groove from the inner surface of the connecting chassis, so that the plurality of plates and the at least one connecting chassis are coupled correspondingly to a curved surface of the pipe.

6. The device of claim 5, wherein the at least one connecting chassis has a flat plate shape with an "H"-shaped cross section, or has a shape with a bent or curved cross section in a middle part thereof so that the first assembly end part and the second assembly end part have a predetermined angle therebetween.

7. The device of claim 5, wherein the at least one connecting chassis and the plates inserted into the at least one connecting chassis respectively have ring-shaped grooves formed by being pressed by the ring-shaped pressing parts, so that the at least one connecting chassis and the plates are engaged and coupled with each other.

8. A method of manufacturing an insulating cover device of a pipe-insulating structure, the method comprising:

preparing a finishing cover configured to cover an outer surface of an insulator surrounding a pipe, and a protective sheet arranged to cover a portion, which is not covered by the finishing cover, of the outer surface of the insulator, with the protective sheet having, at an end thereof, a ring part into which a steel wire is inserted, and preparing a connecting socket integrally comprising a horizontal plate part, an inner vertical plate part extending perpendicularly from the horizontal plate part, and an outer vertical plate part extending perpendicularly from the horizontal plate part, with an insertion groove being formed between the inner vertical plate part and the outer vertical plate part, so as to connect the finishing cover and the protective sheet to each other;

coupling the finishing cover and the connecting socket to each other by forming a plurality of ring-shaped pressing parts in the inner vertical plate part while an end part of the finishing cover is inserted into the insertion groove after inserting the end part of the finishing cover into the insertion groove; and coupling the protective sheet and the connecting socket to each other by clamping the ring part in a form of surrounding the ring part, into which the steel wire is inserted, by using clamping hooks cut from the inner vertical plate part and then bent or rolled up while the ring part of the protective sheet is placed in a corner between the horizontal plate part and the inner vertical plate part of the connecting socket.

9. The method of claim 8, wherein the plurality of ring-shaped pressing parts is formed by pressing the inner vertical plate part with a punch having a ring-shaped cross section, and each of the finishing cover and the outer vertical plate part is pressed by the ring-shaped pressing parts to have ring-shaped grooves so that the inner vertical plate part, the finishing cover, and the outer vertical plate part are engaged and coupled with each other.

10. The method of claim 8, wherein the finishing cover comprises at least one connecting chassis, which is made of soft metal, having a first chassis insertion groove formed in a first end part and a second chassis insertion groove formed in a second end part; and a plurality of plates made of soft metal, and while an end part of a first plate which is one of the plurality of plates is inserted into the first chassis insertion groove and an end part of a second plate adjacent to the first plate is inserted into the second chassis insertion groove, the connecting chassis and the first plate are coupled to each other by a plurality of ring-shaped pressing parts press-molded into ring shapes toward the first chassis insertion groove from an inner surface of the connecting chassis, and the connecting chassis and the second plate are coupled to each other by a plurality of ring-shaped pressing parts press-molded into ring shapes toward the second chassis insertion groove from the inner surface of the connecting chassis, so that the plurality of plates and the at least one connecting chassis are coupled correspondingly to a curved surface of the pipe.

* * * * *